US005454724A

United States Patent [19]
Kloeppel et al.

[11] Patent Number: 5,454,724
[45] Date of Patent: Oct. 3, 1995

[54] FLOATING ELECTRICAL CONTACT FOR SPINDLE MOTOR

[75] Inventors: Klaus Kloeppel, Watsonville; Robert M. Pelstring; John C. Dunfield, both of Santa Cruz, all of Calif.

[73] Assignee: Seagate Technology, Inc., Scotts Valley, Calif.

[21] Appl. No.: 279,497

[22] Filed: Jul. 22, 1994

[51] Int. Cl.⁶ .................................................. H01R 39/00
[52] U.S. Cl. .............................. 439/17; 439/13; 439/39; 439/86; 310/90
[58] Field of Search .......................... 439/17, 22, 27, 439/38, 39, 86, 87, 13; 310/90, 89, 71

[56] References Cited

U.S. PATENT DOCUMENTS

| | | | |
|---|---|---|---|
| 1,973,234 | 9/1934 | Tsavaris | 439/17 |
| 3,691,542 | 9/1972 | Gabor | 310/248 |
| 4,151,431 | 4/1979 | Johnson | 310/12 |
| 4,211,456 | 7/1980 | Sears | 439/39 |
| 4,701,653 | 10/1987 | Merkle et al. | 310/152 |
| 5,051,853 | 9/1991 | Hosoya | 360/99.08 |
| 5,142,425 | 8/1992 | Gailbreath et al. | 360/123 |
| 5,251,081 | 10/1993 | Cossette et al. | 360/97.02 |

FOREIGN PATENT DOCUMENTS 1184114  10/1985  U.S.S.R. ............................. 439/39

*Primary Examiner*—Gary F. Paumen
*Attorney, Agent, or Firm*—LaRiviere, Grubman & Payne

[57] ABSTRACT

Method and apparatus for providing a controlled resistance electrical path from one moving element of an electrical device to second or subsequent element. An electrically conductive media is introduced between the rotating and static element of an electrical device. The media, e.g. conductive grease, may be introduced into the bearings of the device. Alternatively, a housing may be disposed upon one of the elements. Into this housing is introduced a quantity of electrically conductive media and a contact element. The contact element is integral with, or is preloaded against, one end of the shaft of the second element, thereby forming an electrical path from the shaft, through the media to the housing and thence to the first element of the device. The contact element may be seen therefore to be floating in contact with the conductive media, thereby forming a controlled-resistance rotary electrical connector. Physical contact between the contact element and the housing may be implemented or not, as the particular application requires. This rotary connection methodology is especially applicable to the controlled grounding of the rotor of a disc drive electric motor with respect to the stator thereof.

57 Claims, 6 Drawing Sheets

FLOATING ELECTRICAL CONTACT FOR SPINDLE MOTOR

TECHNICAL FIELD

The present invention relates generally to controlling the resistance between two surfaces, a first part of an electrical apparatus with respect to a second part, where the first part moves with respect to the second. Specifically, the present invention teaches a method and apparatus for controlling the resistance between the rotor of an electric motor for use in disc drives with respect to the stator or drive base thereof.

BACKGROUND ART

It is often necessary to control the resistance of one component of an electrical device with respect to another. An example is found in computer disc drives. In this application it is often critical to maintain a specific resistance between the read-write head of the disc drive and the magnetic media disc thereof. This is necessary to prevent any electrical flow between the head and the disc. If the resistance between these two components is too high, an electrostatic charge can build up between the two, which charge can result in an electrostatic discharge from head to disc or vice versa. This discharge will generally result in a loss of data stored on the disc, and will likely result in such damage to the read—write head and/or the disc as to require replacement of the disc drive.

On the other hand, if the resistance between the head and the disc is too low, a similar but different problem occurs. The separation between the head and disc, during operation, is typically measured in micro-inches ($\mu$in). If there exists a difference in electrical potential between the head and disc, insufficient resistance therebetween can cause an electrical current to flow across the gap between the two components.

In at least one disc drive application, it is a goal of the drive's designers to maintain a resistance of approximately 1 meg$\Omega$ (at less than 1 volt potential) between the head and disc of a disc drive. By generally maintaining this level of resistance between the disc and the head, the twin problems of electrostatic discharge and current flow between the two components are generally eliminated.

The problem in maintaining the previously discussed specific resistance lies in maintaining a reliable current path between the rotor of the spindle motor, which drives the disc, and the motor stator which, in many designs, is electrically connected with the arm which supports the read—write head. In many electrical applications, this connectivity between rotating and non-rotating components is accomplished through the use of slip rings, spring-loaded contact fingers and the like.

U.S. Pat. No. 4,701,653 describes a spring finger grounding methodology applied to the end of the shaft of an electric motor for use in a disc drive. U.S. Pat. No. 5,251,081 describes a spring finger grounding methodology applied to the body of the shaft of an electric motor, also for use in a disc drive. U.S. Pat. No. 3,691,542 describes a slip ring grounding methodology applicable to disc drive technology.

In the case where an electric spindle motor is sealed within a disc drive, effective connectivity between the motor's rotor and its stator is both increasingly important and increasingly difficult. Slip rings, contact fingers and the like are essentially friction devices. This friction has several adverse effects in disc drive spindle motor applications.

A first adverse effect of the friction between the contacting elements is that friction can result in abrasion. This abrasion generally leads to particulate matter being abraded from at least one of the contacting elements. Given the extremely small tolerances inherent in current art disc drive technology, these abraded particles can quickly lead to a catastrophic failure of the disc drive.

Motors for use in current disc drive designs are usually quite small: the entire motor is often no larger than 3 mm$\times$25 min. Due to these extreme size limitations, contact fingers and slip rings must be mounted very close to the motor bearings. Particulate matter introduced into these very small precision bearings causes increased acoustic noise and significant bearing wear leading to failure of the drive.

The particulate matter may also migrate onto the surface of the disc or the read—write head. Given the relatively large size of the abraded particles relative to the clearance between the head and the disc, introduction of any particulate matter onto either of these components will almost inevitably result in the instant failure of the drive.

Effective connectivity between the disc drive spindle motor rotor to the stator thereof is made more difficult because, in order to operate properly, disc drives are typically sealed in order to prevent the incursion of contaminants into the disc drive's internal workings. This sealing of the internal components of a disc drive makes repair of these devices essentially impossible. Because it is a principal requirement and aim of the designers and manufacturers of disc drive equipment to increase the mean time between failures (MTBF) of their product, the internal components of a disc drive are required to function for many thousands of hours without any repair or maintenance whatever.

A second adverse effect of the friction devices previously discussed is that the electrical connectivity they provide is not stable over time. Corrosion and abrasion products which may accumulate between the contact elements thereof result in resistances therebetween which are both unstable, and show a worsening trend over time. The abrasion products also generate electrical noise between the components, again with deleterious effect on attempts to maintain a specific resistance between those components.

Contact fingers which contact one end of the rotor shaft of a motor put a pre-load force axially on the shaft. This preload force is transmitted to the bearings of the motor, and results in increased noise and reduced bearing life. Furthermore, increased preload forces induce increased frictional torque. Increasing the preload force in order to maximize electrical connectivity exacerbates these problems.

Finally, slip rings and contact fingers which contact the shaft radially place an axial thrust on the bearings, inducing a radial force which further increases the frictional torque of the motor. This radial force also shortens the bearing's service life. Also implicit in the use of these radial devices is the fact that the further from the center of rotation they are, the larger the swept area they incur, and the more noise, both electrical and acoustical, and abrasion they cause.

In order to overcome the increased frictional torque resultant from either axial or radial loading of the rotor, the motor must generate more rotary torque. To do so increases the size of the motor. This is not a desirable design option in current art disc drive technology.

What is required therefore, to provide a reliable current path or connectivity between the moving and static portions of a precision electrical device is a low-friction contact element, applied at, or close to, the axis of spindle motor rotor rotation. The connectivity would provide for and enable an essentially continuous resistance across the interface between the rotor and stator. This connectivity should not result in any appreciable of electrical or acoustical noise, or in the production of abraded particles.

DISCLOSURE OF INVENTION

The rotary electrical connection as taught by the present invention is a low-friction contact element applied at, or close to, the axis of spindle motor rotor rotation and between the rotary and static elements of the motor. The connection provides for, and enables an essentially continuous resistance across the interface between the rotary and static elements. The resistance may be selected and determined by the user.

The present invention comprises two broad strategies for creating and maintaining this rotary electrical connection. The first method is by the introduction into the motor bearings of an electrically conductive grease, oil or other lubricant. The second method is through the provision of a low-friction contact element at, or substantially close to the axis of rotation of the rotor.

Conductive greases are lubricating greases which have admixed therewith a conductive material. Such conductive materials include, by way of illustration but not limitation: finely divided metallic or carbon particles. Conductive greases when used to lubricate the bearings of the disk drive motor not only lubricate the bearings, but further serve to electrically connect the rotor to the stator. By selecting a conductive grease or media with a specific resistivity, the resistance through the bearings of the present invention can be controlled.

The second method of the present invention comprises an low-friction rotary electrical connector. This connector generally consists of a housing, at least a portion of which is electrically conductive and is disposed upon, and in electrical contact with, one element of an electrical device, for instance the stator of an electric motor. The housing generally comprises a housing body and housing cap. When assembled, the housing body and housing cap in combination form a housing cavity.

Received into the housing cavity is an electrically conductive contact element. The contact element may be integral with a second element of the electrical device, for instance the rotor of the electric motor, or may be a separate element which is preloaded, urged, or impelled against the second element of the electrical device. Further received into the housing cavity is a quantity of electrically conductive media. By selecting a conductive media with a specific resistivity, the resistance through the connector of the present invention can be controlled.

The contact element of the present invention can be said to be "floating" in the conductive media, which is therefore in contact with both the contact element and the housing. In this manner, a path for electrically connecting the rotor with respect to the stator is established from the rotor, though the contact element in mechanical and electrical contact with the rotor, through the conductive media in contact with both the contact element and the housing, and thence through the housing to the stator. In this implementation, the contact element is substantially not in mechanical contact with the housing: any contact therebetween being a transitory phenomenon. The low-friction feature of the present invention is maintained even in the event of this transitory contact by means of the conductive media disposed upon the contact element and further acting as a lubricating grease. The contact element of the present invention may be aligned with respect to the axis of rotation of the rotor by machining the rotating element to create a cavity therein which receives the contact element therein.

The contact element and housing of the present invention may be formed of metallic or non-metallic material, so long as at least a portion of each is electrically conductive. The contact element and housing of the present invention may further be fashioned of magnetic or non-magnetic material. The respective shapes of both the contact element and the housing are application dependent, and may be modified to meet the requirements of a given application.

Where the contact element is not integrally formed with the rotor, the present invention contemplates any of several methods for preloading the contact element against the rotor. By way of illustration, but not limitation, preloading may be accomplished by a physical urging or impelling device such as a spring, membrane, resilient foam, dished washer or other similar urging methodology well known to those skilled in the art. Alternatively, contact element preloading may be effected by magnetic attraction or repulsion. The force with which the contact element of the present invention is preloaded against the rotor is an application-dependent variable.

The contact element of the present invention is capable of forming electrical contact in a number of geometries. Again, illustrating but not limiting these geometries are: point contact, linear contact (for instance a circle) and surface, or area, contact. While the contact geometry for any specific use is highly application dependent, any such geometry is specifically contemplated by the principles of the present invention.

Other application dependent variables are the shape of the contact element and the exact form of the housing. Contact element shape is highly dependent on the specific application and may take many forms. These forms include, but are not limited to, spheres, cylindrical sections, conic sections, ogives, frustums or needle shapes. The housing form is likewise application dependent, and may take a variety of forms responsive to the demands of the application.

The electrically conductive media generally comprises a material having lubricating properties such as grease, oil, or the like, which has been made electrically conductive by the addition of a conductive material. Such material could include very finely divided conductive particles of silver, copper, carbon-black, or other electrically conductive material admixed with the lubricant. The media has a specific resistance or resistivity. One application required a resistivity of $2 \times 10^3$ Ω cm (ohm centimeters) at 25° C. In this case, a specify electrically conductive lubricating grease was selected. In other applications, with different resistance requirements, a different media could be chosen.

The preceding discussion of the present invention has drawn upon the example wherein the housing is disposed upon the stator of a rotating shaft motor, and houses the contact element for preloading against the rotor thereof. The principles of the present invention may, with equal facility, be implemented by disposing the housing upon the rotor of, for instance a stationary shaft motor, and urging the contact element into contact with the stator thereof.

The preceding discussion has further focused on implementing the present invention on an electric motor. It will be immediately apparent to those skilled in the art that the principles of the present invention may with facility be implemented on a wide variety of electrical apparatus having a first part capable of being moved with respect to a second or subsequent part, and where it is desirable to provide a controlled resistance electrical path from the first part to the second or subsequent part. The present invention specifically contemplates such implementations.

BRIEF DESCRIPTION OF THE DRAWINGS

For fuller understanding of the present invention, reference is made to the accompanying drawing in the following detailed description of the Best Mode of Carrying Out the Invention. In the drawing.

BEST MODE OF CARRYING OUT THE INVENTION

Figure 1:
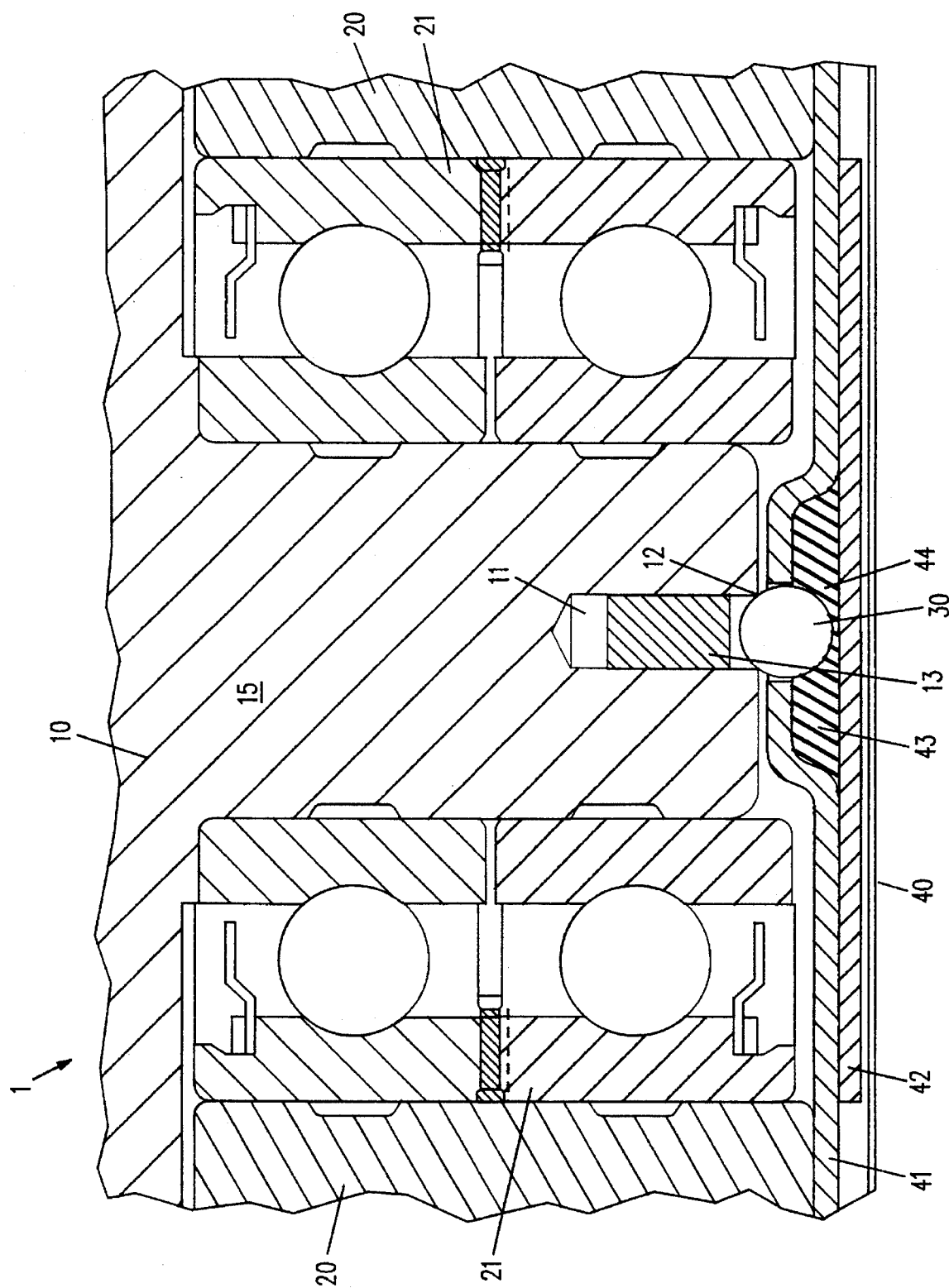
FIG. 1 is a vertical cross-section taken through a portion of a rotating shaft electric motor, and showing the best mode of carrying out the present invention.

Referring to FIG. 1, a vertical cross section taken through an electrical device 1 is shown. In the preferred embodiment, electrical device 1 is an electric motor comprising two principal elements, rotor 10 and stator 20. Bearing 21 supports and enables rotary motion of rotor 10 within stator 20. Electrically conductive housing 40 is disposed upon, and in electrical contact with stator 20. Housing 40 generally comprises a housing body 41 and housing cap 42. When assembled, housing body 41 and housing cap 42 in combination form housing cavity 43. Received into housing cavity 43 is a quantity of electrically conductive media 44. Further received into the quantity of electrically conductive media 44 within housing cavity 43 is contact element 30. Contact element 30 is composed of a magnetic material which is further electrically conductive, such as steel.

One portion of rotor 10 defines rotor shaft 15, which further defines a coaxially located chamber 11. Disposed within chamber 11 is magnet 13. Magnet 13 is further coaxial with rotor shaft 10 and is retained in place in chamber 11 by press fit or adhesives, such as epoxies or cyanoacrylates. Magnet 13 is disposed within chamber 11 to a sufficient depth to enable contact element 30 to form and maintain contact with rotor shaft 15 at chamber perimeter 12. In this embodiment, contact element 30 forms a linear contact with respect to rotor shaft 15 at chamber perimeter 12. Chamber perimeter 12 maintains contact element 30 in axial alignment with rotor shaft 15.

An electrically conductive media 44, suitable for inclusion in the present invention, comprises a lubricating grease or oil which has been made electrically conductive by the addition of conductive material. Such material may include very finely divided conductive particles of silver, copper, carbon-black, or other electrically conductive material admixed with the lubricant. A requisite property of media 44 is a determinable, and hence selectable, specific resistance or resistivity. In one application, a resistivity of $2 \times 10^3$ ohm-centimeters ($\Omega$ cm) at 25° centigrade was required. In order to meet this requirement, NSK ECA grease, available from NSK Corporation, 2099 Gateway Pl., San Jose, Calif. was utilized for this application. Alternative media, based on different fluids and having different resistivities may be required for other applications. The use of such alternative media is specifically contemplated by the teachings of the present invention.

The rotary electrical connector according to the present invention is provided, in this implementation, from rotor shaft 15, to contact element 30 which has been urged, or preloaded, into mechanical and electrical contact with shaft 15 by magnet 13. Contact element 30 is in physical and electrical contact with conductive media 44. Conductive media 44 is further in physical and electrical contact with housing 40, which is ultimately in electrical contact with stator 20.

It will be immediately apparent to those skilled in the art that other methodologies for preloading contact element 30 into electrical and mechanical connection with rotor 10 may with equal facility be implemented. By way of example but not limitation, the following urging methodologies may be used to provide this preloading function: alternative magnetic urging methodologies; a spring or other physical urging device: or vapor or gas pressure urging device. Alternatively, rotor shaft 15 may be formed with contact element as an integral part thereof, suitable for direct contact with conductive media 44. These alternative methodologies are illustrated in FIGS. 2 through 11.

Figure 2:
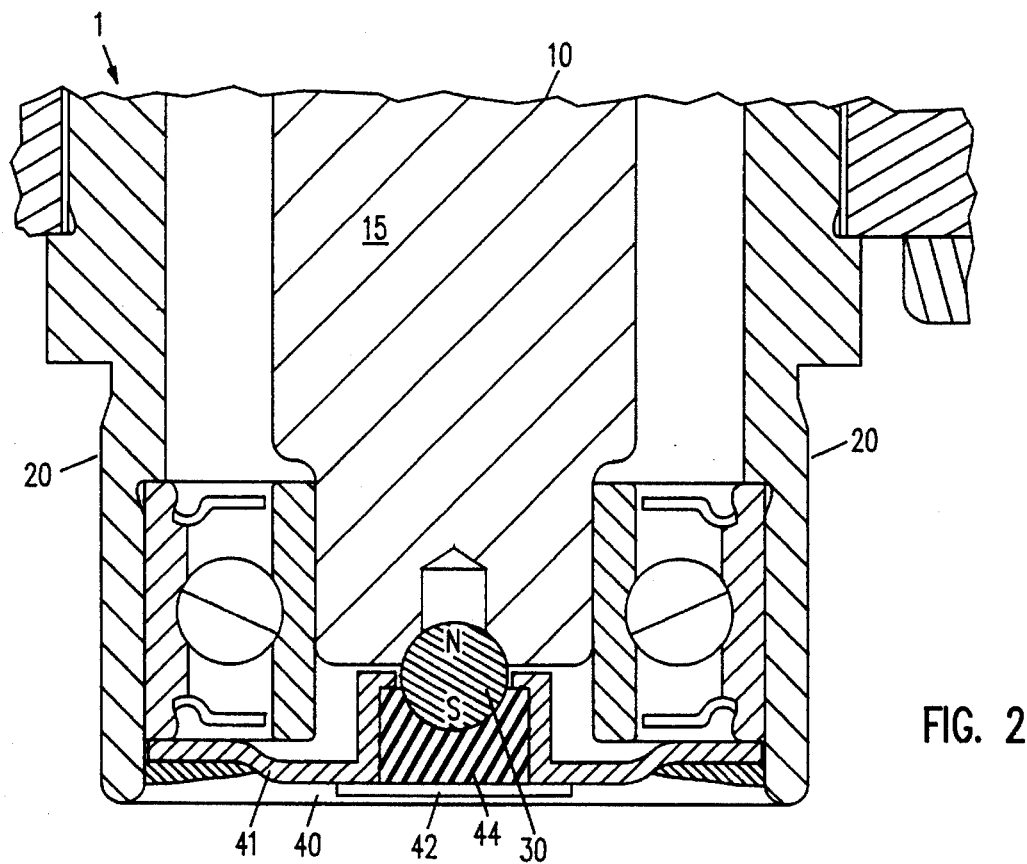
FIG. 2 is a vertical cross-section taken through a portion of an electric motor, and showing a first alternative magnetic preloading methodology.

Referring now to FIG. 2, an alternative magnetic preloading methodology is disclosed. In this embodiment, contact element 30 is retained within housing 40 again comprised of container body 41 and housing cap 42. In this embodiment, however, contact element 30 itself is magnetized, and the magnetic attraction between contact element 30 and ferrous rotor shaft 15 insures mechanical and electrical contact between contact element 30 and the rotor shaft. In this embodiment, housing 40 is formed of a non-magnetic material.

Figure 3:
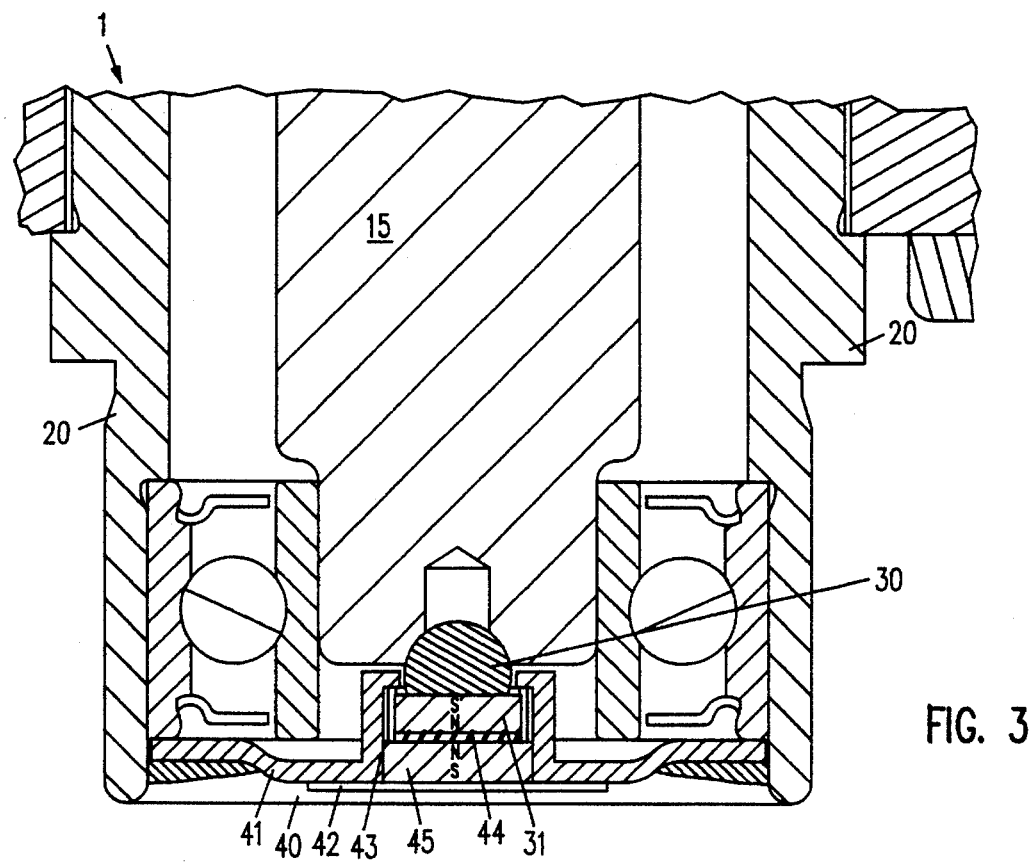
FIG. 3 is a vertical cross-section taken through a portion of an electric motor, and showing a second alternative magnetic preloading methodology.

Another magnetic preloading strategy is detailed at FIG. 3. According to this embodiment of the present invention, disposed within housing cavity 43 are a pair of magnets 31 and 45. Magnets 31 and 45 are generally disc or columnar in shape and are disposed within housing cavity 43 such that similar poles of each of the magnets face one another in juxtaposition. Magnetic repulsion forces, created by like poles in juxtaposition, serve to force contact element 30 into mechanical and electrical contact with rotor shaft 15. A quantity of electrically conductive media 44 is further more disposed within housing cavity 43 to provide an electrical connection between contact element 30 and housing 40. Again, in this embodiment, housing 40 is formed of substantially non-magnetic material.

Figure 4:
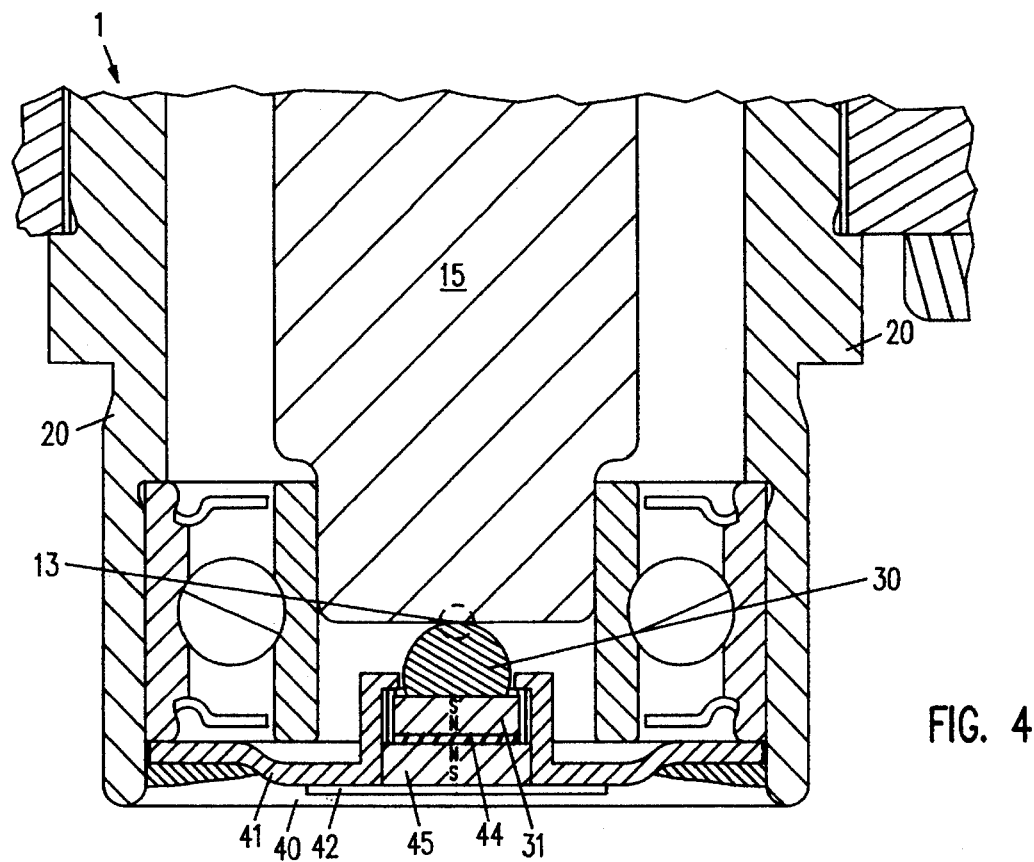
FIG. 4 is a vertical cross-section taken through a portion of an electric motor, and showing a first alternative contact geometry.

A minor modification of the preceding embodiment of the present invention is shown at FIG. 4. In this embodiment, rotor shaft 15 is formed without coaxial chamber 11. In this manner, contact element 30, urged by the repulsion of magnets 31 and 45, contacts rotor shaft 15 at a single point, 13.

Figure 5:
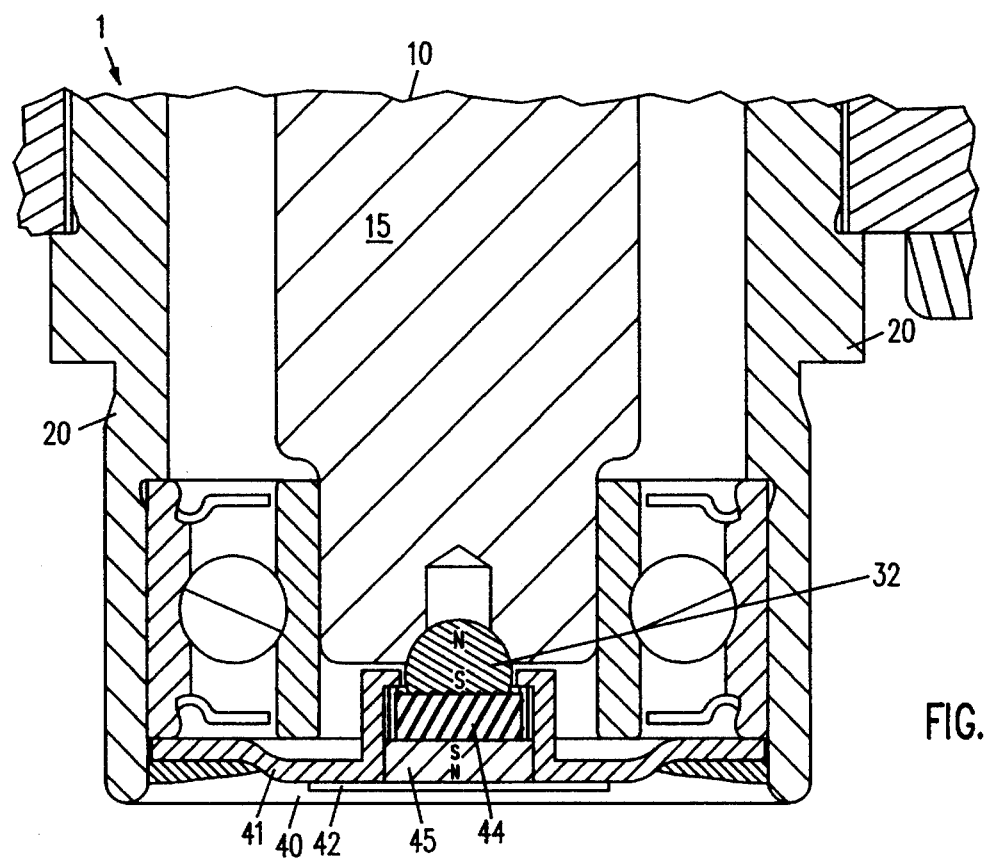
FIG. 5 is a vertical cross-section taken through a portion of an electric motor, and showing a third alternative magnetic preloading methodology.

Yet another embodiment of the present invention, again including a magnetic preloading, is detailed at FIG. 5. In this embodiment of the present invention, previously discussed magnet 31 and separate contact element 30 are combined by forming contact element 30 out of a magnetic material, or by magnetizing contact element 32 after its formation. In this embodiment of the present invention, contact element 32 is shaped so as to maintain its orientation with respect to rotor shaft 15 during operation of the motor. In this embodiment, contact element 32 is formed electrically conductive materials including, but not limited to: iron, steel, stainless steel, cobalt, and magnetic alloys.

Where it is necessary to increase the electrical conductivity of a contact element in any of the embodiments of the present invention, said contact may be plated or coated with a highly conductive material, as is well known in the art. Such coatings include, but are again not limited to: gold, silver, copper, brass or other highly conductive coatings or platings.

It is a particular feature of the present invention that the contact element thereof may be implemented in a wide variety of geometric shapes, independent of the preloading means. By way of illustration but not limitation, the contact element of the present invention may be implemented as a sphere, cylindrical section, conic section, ogive, frustum or needle shape. Contact element geometry is, therefore, application dependent and may be highly variable within the scope of the present invention. Such modifications of contact element geometry are specifically contemplated by the present invention.

Figure 6:
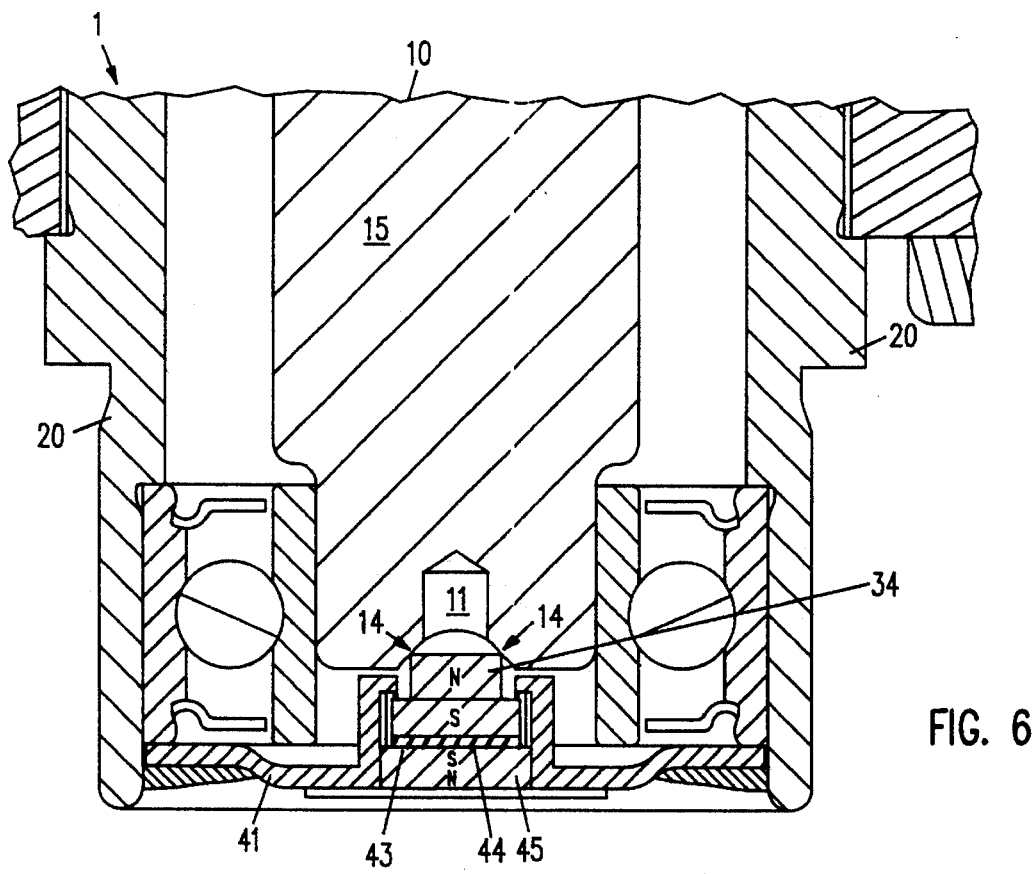
FIG. 6 is a vertical cross-section taken through a portion of an electric motor, and showing a second alternative contact geometry.

An illustration of one alternate contact element geometry is shown at FIG. 6. Referring to that figure, contact element 34 is shown as a stepped cylindrical section which maintains electrical and mechanical contact with rotor shaft 15 at chamfer 14, which is implemented contiguously with chamber 11. In this embodiment, magnet 45 not only serves to provide magnetic repulsion with respect to magnetic contact element 34, but is further formed to seal housing cavity 43, thereby eliminating the need for housing cap 42. In this embodiment, magnet 45 is installed in and seals housing cavity 43 preventing the unwanted egress of conductive media 44 therefrom.

Figure 7:
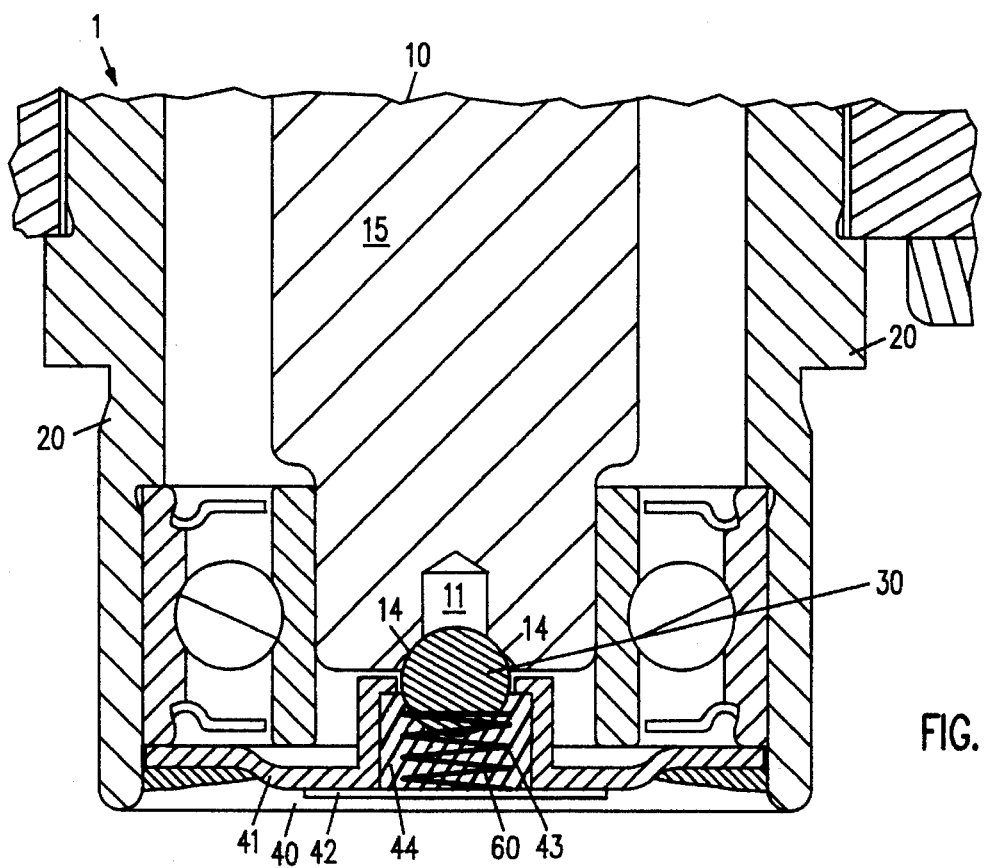
FIG. 7 is a vertical cross-section taken through a portion of an electric motor, and showing a spring-based preloading methodology.

A further alternative to the magnetic preloading means previously discussed is the use of mechanical preloading methodologies. One such methodology is shown at FIG. 7. Referring to that figure, contact element 30 is preloaded against rotor shaft 15 at chamfer 14 by spring 60. While a coil spring is disclosed in this figure, it will be immediately apparent to those skilled in the art that any of several spring preloading devices may, with equal facility, be implemented in this embodiment of the present invention. By way of illustration but not limitation, spring preloading devices include bevelled washers, flat springs, arcuate springs, or helical springs.

With continuing reference to FIG. 7, spring 60 is held within housing cavity 43, again formed of housing body 41 by housing cap 42. Housing cap 42 further serves to retain a quantity of conductive media 44 within housing cavity 43.

Figure 8:
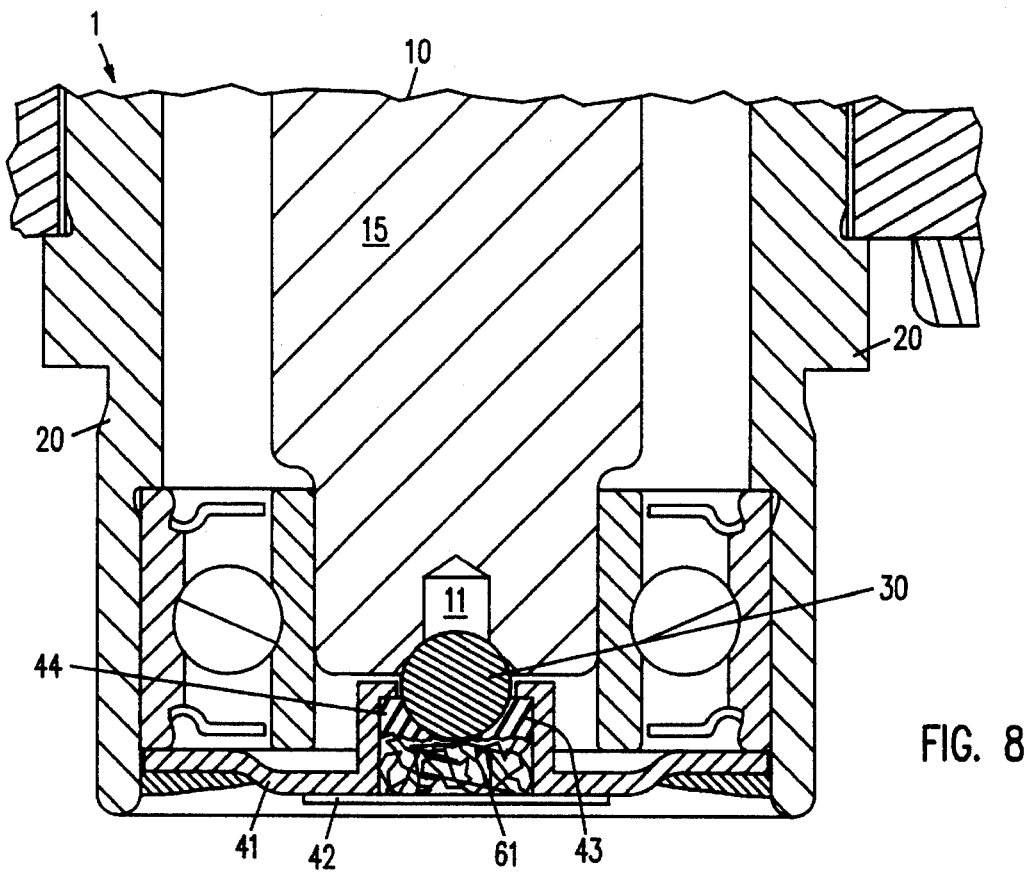
FIG. 8 is a vertical cross-section taken through a portion of an electric motor, and showing a resilient foam-based preloading methodology.

An alternative mechanical preloading methodology is shown at FIG. 8. According to this embodiment of the present invention, the previously discussed spring element 60 is replaced with a section of electrically conductive, resilient foam 61. Foam 61 may be compressed to a certain degree by housing cap 42 and/or contact element 30 in order to maintain preload pressure on contact element 30.

Figure 9:
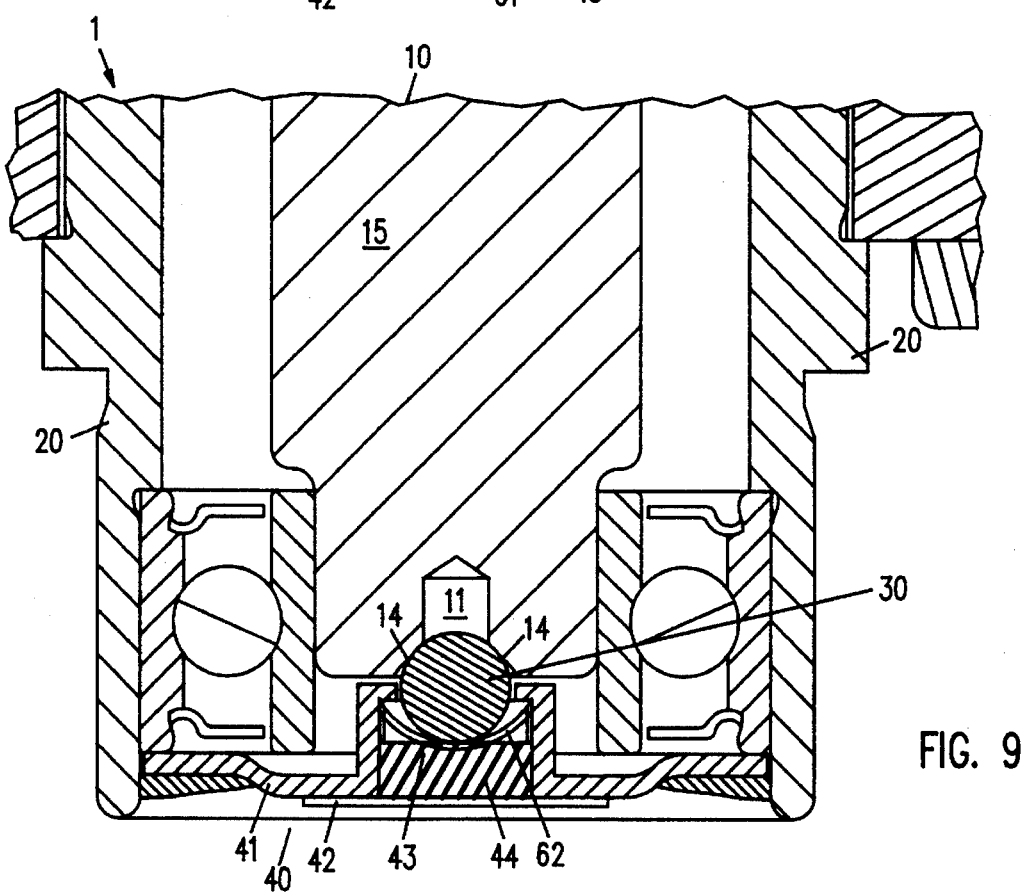
FIG. 9 is a vertical cross-section taken through a portion of an electric motor, and showing a resilient membrane-based preloading methodology.

Another alternative mechanical preloading methodology is shown at FIG. 9. This methodology employs a resilient membrane to preload contact element 30 against chamfer 14 of rotor shaft 15. Membrane 62 is maintained in electrical contact with a quantity of conductive media 44 retained within housing cavity 43. Membrane 62 may be either electrically conductive itself or may be porous so as to allow a sufficient quantity of conductive media 44 to come in contact through the pores of membrane 62 with contact element 30. Membrane 62 may be single- or multi-layered.

Figure 10:
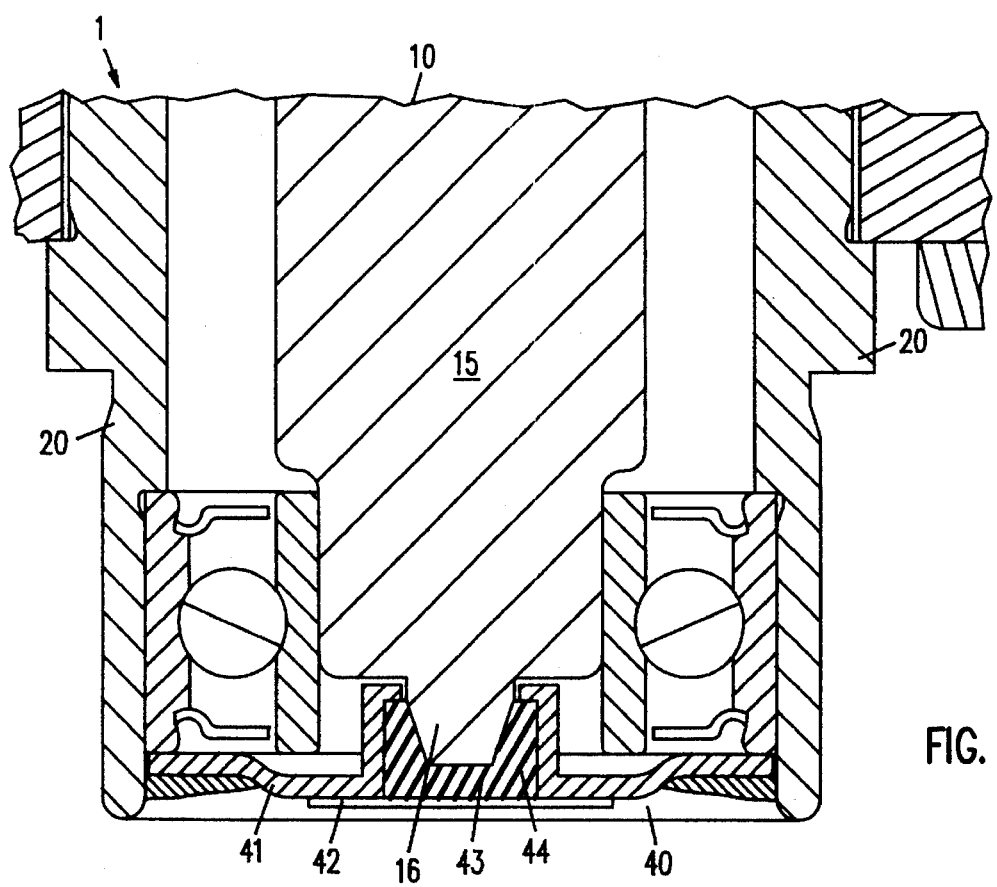
FIG. 10 is a vertical cross-section taken through a portion of an electric motor, and showing the contact element of the present invention formed integrally on the rotor of the electric motor.

As an alternative to a separate contact element, as previously discussed, the present invention further teaches one end of rotor shaft 15 being suitable formed for insertion into housing cavity 43, thereby making electrical contact directly with conductive media 44, as shown in FIG. 10.

Figure 11:
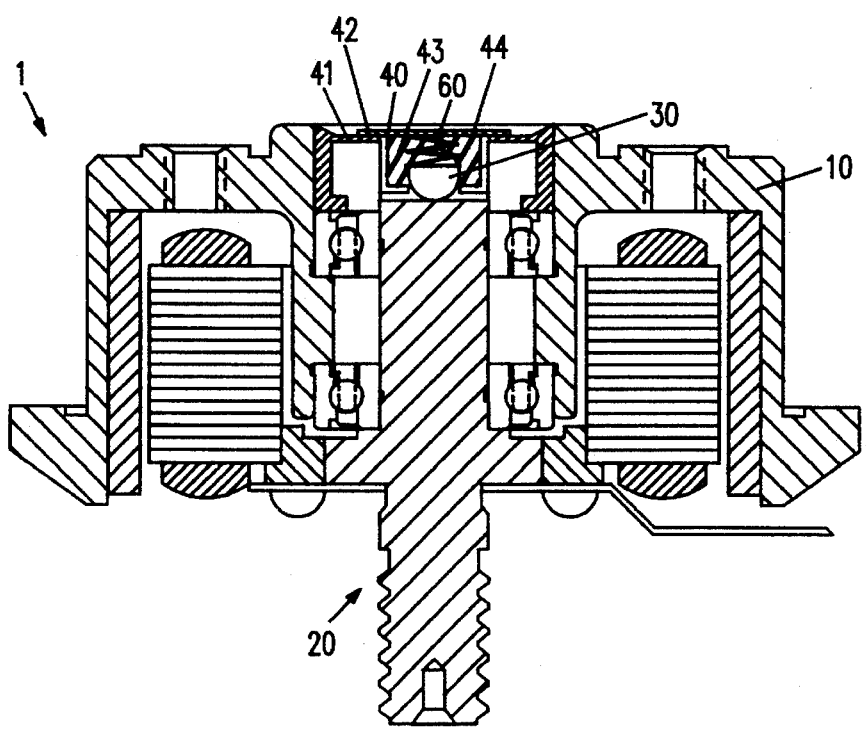
FIG. 11 is a vertical cross-section taken through an electric motor having a stationary shaft and an external rotor, and showing the present invention implemented on the stationery rotor.

Finally, while the discussion of the present invention has focused on an application comprising a rotating shaft electric motor and disposing housing 40 and contact element 30 upon stator 20 thereof, it will be immediately apparent to those skilled in the art that the principles of the present invention may, with equal facility, be implemented on a stationary shaft electrical motor. This application may be implemented by disposing housing 40 upon rotor 10, to enable contact by contact element 30 with stator 20. Such an embodiment is shown in FIG. 11.

The present invention has been particularly shown and described with respect to certain preferred embodiments and features thereof. However, it should be readily apparent to those of ordinary skill in the art that various changes and modifications in form and detail may be made without departing from the spirit and scope of the invention as set forth in the appended claims.

The invention set forth herein has been applied to the general example of a disc drive spindle motor. It will be immediately apparent to those skilled in the art that the principles of the present invention are applicable to a wide range of devices which require a reliable electrical connection between a stationary and a moving element. Such devices may include, by way of illustration and not limitation: meter movements, servo mechanisms, solenoids, and recording arms. The utilization of the floating contact is specifically contemplated for inclusion in such devices, and is taught herein by the principles of the present invention.

The invention illustratively disclosed herein may further be practiced without any element which is not specifically disclosed herein. Alternative conductive media, preloading methodologies, contact element and housing geometries and materials which are not identically disclosed herein are specifically contemplated in forming the floating electrical contact of the present invention.

What is claimed is:

1. A low-friction rotary electrical connector for providing a controlled-resistance electrical path between a first element of a device, which rotates with respect to a second element of said device, and said second element, the connector comprising:

a contact means disposed upon said first element of said device and substantially at the axis of rotation of said first element, said contact means in substantial electrical contact with said first element;

a substantially electrically conductive housing means disposed upon said second element of said device and centered substantially at the axis of rotation of said first element, said housing means in substantial electrical contact with said second element and defining a cavity means therein, said cavity means defining an opening facing said first element and further centered substantially at the axis of rotation of said first element;

a quantity of electrically conductive fluid disposed within said cavity means in said housing means, and in substantial electrical contact with said housing means; and said contact means disposed through said opening in said cavity means and in substantial electrical contact with said conductive fluid therein.

2. A low-friction rotary electrical connector for providing a controlled-resistance electrical path between a first element of an electrical device, which rotates with respect to a second element of said device, and said second element, the connector comprising:

an electrically conductive contact means disposed upon said first element of said device and substantially at the axis of rotation of said first element;

a preloading means for urging said contact means into substantial electrical contact with said first element;

a substantially electrically conductive housing means disposed upon said second element of said device, centered substantially at the axis of rotation of said first element, said housing means in substantial electrical contact with said second element and defining a cavity means therein, said cavity means defining an opening facing said first element and further centered substantially at the axis of rotation of said first element;

a quantity of electrically conductive fluid disposed within said cavity in said housing means, and in substantial electrical contact with said housing means; and said contact means disposed through said opening in said cavity means and in substantial electrical contact with said conductive fluid therein.

3. The low-friction rotary electrical connector of claim 2 wherein said contact element is plated with a highly conductive material.

4. The low-friction rotary electrical connector of claim 2, wherein said preloading means further comprises a mechanical preloading device.

5. The low-friction rotary electrical connector of claim 4, wherein said mechanical preloading device further comprises a spring, disposed within said cavity means and between said housing means and said contact means.

6. The low-friction rotary electrical connector of claim 4, wherein said mechanical preloading device further comprises a quantity of electrically conductive and resilient foam, said foam disposed within said cavity means and between said housing means and said contact means.

7. The low-friction rotary electrical connector of claim 4, wherein said mechanical preloading device further comprises:

a resilient membrane, disposed upon said housing means, substantially over said cavity means, and in substantial electrical contact with said conductive fluid; and said contact means, disposed upon said resilient membrane and urged by said resilient membrane into mechanical and electrical contact with said first element of said device.

8. The low-friction rotary electrical connector of claim 7, wherein said resilient membrane is electrically conductive.

9. The low-friction rotary electrical connector of claim 7, wherein said resilient membrane is substantially porous with respect to said conductive fluid.

10. The low-friction rotary electrical connector of claim 2, wherein said preloading means further comprises a magnetic preloading means.

11. The low-friction rotary electrical connector of claim 10, wherein said magnetic preloading means further comprises:

a first magnet means disposed within said cavity means, and in electrical and mechanical contact with said conductive fluid;

a second magnet means further disposed within said cavity means and further in electrical and mechanical contact with said conductive fluid; and said first and said second magnet means further disposed within said cavity means with like poles in juxtaposition.

12. The low-friction rotary electrical connector of claim 11, wherein said contact means, formed of magnetic material, further comprises said second magnet means.

13. The low-friction rotary electrical connector of claim 11, wherein said contact means is a separate element, urged into contact with said first element of said electrical device by said second magnet means.

14. The low-friction rotary electrical connector of claim 10, wherein said magnetic preloading means further comprises:

said first element of said device defining therein a coaxial chamber;

a magnet means disposed within said chamber;

said contact means formed of magnetic material, and urged into mechanical and electrical contact with said first element by magnetic attraction of said magnet means.

15. The low-friction rotary electrical connector of claim 14, wherein said mechanical and electrical contact further comprises a point contact between said contact means and said first element.

16. The low-friction rotary electrical connector of claim 14, wherein said mechanical and electrical contact further comprises a linear contact between said contact means and a perimeter formed by said coaxial chamber and said first element.

17. The low-friction rotary electrical connector of claim 12, wherein said mechanical and electrical contact further comprises a surface contact between said contact means and said first element.

18. The low-friction rotary electrical connector of claim 2, wherein said electrical device is a rotating shaft electric motor, said motor comprising:

said first element defining the rotor of said motor; and said second element defining the stator of said motor.

19. The low-friction rotary electrical connector of claim 2, wherein said electrical device is a stationary shaft electric motor, said motor further comprising:

said first element defining the rotor of said motor; and said second element defining said stationary shaft of said motor.

20. A low-friction rotary electrical connector for providing a controlled-resistance electrical path between a first element of an electrical device, which rotates with respect to a second element of said device, and said second element, the connector comprising:

an electrically conductive contact means formed integrally with said first element of said device and substantially at the axis of rotation of said first element;

a substantially electrically conductive housing means disposed upon said second element of said device, centered substantially at the axis of rotation of said first element, said housing means in substantial electrical contact with said second element and defining a cavity means therein, said cavity means defining an opening facing said first element and further centered substantially at the axis of rotation of said first element;

a quantity of electrically conductive fluid disposed within said cavity in said housing means, and in substantial electrical contact with said housing means; and said contact means disposed through said opening in said cavity means and in substantial electrical contact with said conductive fluid therein.

21. A low-friction rotary electrical connector for providing a controlled-resistance electrical path between a first element of an electric motor, which rotates with respect to a second element of said motor, and said second element, the connector comprising:

a contact element disposed upon said first element of said device and substantially at the axis of rotation of said first element;

a preloading device for urging said contact element into substantial electrical contact with said first element;

a substantially electrically conductive housing disposed upon said second element of said motor, centered substantially at the axis of rotation of said first element, said housing in substantial electrical contact with said second element and defining a cavity means therein, said cavity means defining an opening facing said first element and further centered substantially at the axis of rotation of said first element;

a quantity of electrically conductive fluid disposed within said cavity in said housing, and in substantial electrical contact with said housing; and said contact element disposed through said opening in said cavity and in substantial electrical contact with said conductive fluid therein.

22. The low-friction rotary electrical connector of claim 21, wherein said preloading device further comprises a mechanical preloading device.

23. The low-friction rotary electrical connector of claim 22, wherein said mechanical preloading device further comprises a spring, disposed within said cavity and between said housing and said contact element.

24. The low-friction rotary electrical connector of claim 22, wherein said mechanical preloading device further comprises a qunatity of electrically conductive resilient foam, said foam disposed within said cavity and between said housing and said contact element.

25. The low-friction rotary electrical connector of claim 22, wherein said mechanical preloading device further comprises:

a resilient membrane, disposed upon said housing, substantially over said cavity, and in substantial electrical contact with said conductive fluid; and said contact element, disposed upon said resilient membrane and urged by said resilient membrane into mechanical and electrical contact with said first element of said device.

26. The low-friction rotary electrical connector of claim 25, wherein said resilient membrane is electrically conductive.

27. The low-friction rotary electrical connector of claim 25, wherein said resilient membrane is substantiality porous with respect to said conductive fluid.

28. The low-friction rotary electrical connector of claim 21, wherein said preloading device further comprises a magnetic preloading device.

29. The low-friction rotary electrical connector of claim 28, wherein said magnetic preloading device further comprises:

a first magnet disposed within said cavity and in electrical and mechanical contact with said conductive fluid;

a second magnet further disposed within said cavity and further in electrical and mechanical contact with said conductive fluid; and said first and said second magnet further disposed within said cavity with like poles in juxtaposition.

30. The low-friction rotary electrical connector of claim 29, wherein said contact element, formed of magnetic material, further comprises said second magnet.

31. The low-friction rotary electrical connector of claim 29, wherein said contact element is a separate element, urged into contact with said first element of said electrical device by said second magnet.

32. The low-friction rotary electrical connector of claim 28, wherein said magnetic preloading device further comprises:

said first element of said device defining therein a coaxial chamber;

a magnet disposed within said chamber;

said contact element formed of magnetic material, and urged into mechanical and electrical contact with said first element by magnetic attraction of said magnet.

33. The low-friction rotary electrical connector of claim 32, wherein said mechanical and electrical contact further comprises a point contact between said contact element and said first element.

34. The low-friction rotary electrical connector of claim 32, wherein said mechanical and electrical contact further comprises a linear contact between said contact element and a perimeter formed by said coaxial chamber and said first element.

35. The low-friction rotary electrical connector of claim 21, wherein said electrical motor is a rotating shaft electric motor, said motor comprising:

said first element defining the rotor of said motor; and said second element defining the stator of said motor.

36. The low-friction rotary electrical connector of claim 21, wherein said electrical motor is a stationary shaft electric motor, said motor further comprising:

said first element defining the rotor of said motor; and said second element defining said stationary shaft of said motor.

37. A low-friction rotary electrical connector for providing a controlled-resistance electrical path between a first element of an electric motor, which rotates with respect to a second element of said motor, and said second element, the connector comprising:

a contact element formed integrally with said first element of said device and substantially at the axis of rotation of said first element;

a substantially electrically conductive housing disposed upon said second element of said motor, centered substantially at the axis of rotation of said first element, said housing in substantial electrical contact with said second element and defining a cavity means therein, said cavity means defining an opening facing said first element and further centered substantially at the axis of rotation of said first element;

a quantity of electrically conductive fluid disposed within said cavity in said housing, and in substantial electrical contact with said housing; and said contact element disposed through said opening in said cavity and in substantial electrical contact with said conductive fluid therein.

38. A method of providing a low-friction, controlled-resistance electrical path between a first element of an electrical device, which rotates with respect to a second element of said device, and said second element, the method comprising the steps of:

disposing an electrically conductive contact means upon said first element of said device and substantially at the axis of rotation of said first element;

urging, with a preloading means, said contact means into substantial electrical contact with said first element;

disposing a substantially electrically conductive housing means upon said second element of said device, said housing means centered substantially at the axis of rotation of said first element and in substantial electrical contact with said second element and defining a cavity means therein, said cavity means defining an opening facing said first element and further centered substantially at the axis of rotation of said first element;

disposing a quantity of electrically conductive fluid within said cavity in said housing means, and in substantial electrical contact with said housing means; and disposing said contact means through said opening in said cavity means and in substantial electrical contact with said conductive fluid therein.

39. The method of claim 38, wherein said urging step further comprises urging said contact means with a mechanical preloading device.

40. The method of claim 39, wherein said urging step further comprises disposing a spring within said cavity means and between said housing means and said contact means.

41. The method of claim 39, wherein said urging step further comprises urging said contact means with a quantity of electrically conductive and resilient foam, said foam disposed within said cavity means and between said housing means and said contact means.

42. The method of claim 39, wherein said urging step further comprises the steps of:

disposing a resilient membrane upon said housing means, substantially over said cavity means, and in substantial electrical contact with said conductive fluid; and disposing said contact means upon said resilient membrane, thereby urging said contact means into mechanical and electrical contact with said first element of said device.

43. The method of claim 42, further comprising the step of forming said resilient membrane from an electrically conductive material.

44. The method of claim 42, further comprising the step of forming said resilient membrane from a material which is substantially porous with respect to said conductive fluid.

45. The method of claim 38, wherein said urging step further comprises urging said contact means with a magnetic preloading means.

46. The method of claim 45, further comprising the steps of:

disposing a first magnet means within said cavity means, and in electrical and mechanical contact with said conductive fluid;

further disposing a second magnet means within said cavity means and further in electrical and mechanical contact with said conductive fluid; and further disposing within said cavity means said first and said second magnet means having like poles in juxtaposition.

47. The method of claim 46, further comprising the step forming said contact means of magnetic material, said contact means thereby comprising said second magnet means.

48. The method of claim 46, further comprising the step of urging said contact means into contact with said first element of said electrical device by said second magnet means, said contact means being a separate element.

49. The method of claim 45, further comprising the steps of:

defining within said first element of said device a coaxial chamber;

disposing within said chamber a magnet means;

forming said contact means of magnetic material; and urging said contact means into substantial mechanical and electrical contact with said first element by magnetic attraction of said contact means to said magnet means.

50. The method of claim 49, further comprising the step of forming a point contact between said contact means and said first element.

51. The method of claim 49, further comprising the steps of: forming a perimeter between said coaxial chamber and said first element; and forming a linear contact between said contact means and said perimeter.

52. The method of claim 38, wherein said electrical device is a rotating shaft electric motor, said motor comprising:

said first element defining the rotor of said motor; and said second element defining the stator of said motor.

53. The method of claim 38, wherein said electrical device is a stationary shaft electric motor, said motor further comprising:

said first element defining the rotor of said motor; and said second element defining said stationary shaft of said motor.

54. A method of providing a low-friction, controlled-resistance electrical path between a first element of an electrical device, which rotates with respect to a second element of said device, and said second element, the method comprising the steps of:

forming an electrically conductive contact means integrally with said first element of said device and substantially at the axis of rotation of said first element;

disposing a substantially electrically conductive housing means upon said second element of said device, said housing means centered substantially at the axis of rotation of said first element and in substantial electrical contact with said second element and defining a cavity means therein, said cavity means defining an opening facing said first element and further centered substantially at the axis of rotation of said first element;

disposing a quantity of electrically conductive fluid within said cavity in said housing means, and in substantial electrical contact with said housing means; and disposing said contact means through said opening in said cavity means and in substantial electrical contact with said conductive fluid therein.

55. A low-friction rotary electrical connector for providing a controlled-resistance electrical path between a first element of an electric motor, which rotates with respect to a second element of said motor, and said second element, the connector comprising:

said first element of said motor defining therein a coaxial chamber, substantially at the axis of rotation of said first element;

a magnet disposed within said chamber;

a spherical electrical contact element formed of magnetic material, and urged into mechanical and electrical contact with said first element by magnetic attraction of said magnet, thereby forming a linear contact between said contact element and a perimeter formed by said coaxial chamber and said first element.

a substantially electrically conductive housing disposed upon said second element of said motor, centered substantially at the axis of rotation of said first element, said housing in substantial electrical contact with said second element and defining a cavity therein, said cavity defining an opening facing said first element and further centered substantially at the axis of rotation of said first element;

a quantity of electrically conductive grease disposed within said cavity in said housing, and in substantial electrical contact with said housing; and said contact element disposed through said opening in said cavity and in substantial electrical contact with said conductive grease therein.

56. The connector of claim 55, wherein said electrical motor is a rotating shaft electric motor, said motor comprising:

said first element defining the rotor of said motor; and said second element defining the stator of said motor.

57. The connector of claim 55, wherein said electrical motor is a stationary shaft electric motor, said motor further comprising:

said first element defining the rotor of said motor; and said second element defining said stationary shaft of said motor.

* * * * *

UNITED STATES PATENT AND TRADEMARK OFFICE
CERTIFICATE OF CORRECTION

PATENT NO. : 5,454,724

DATED : October 3, 1995

INVENTOR(S) : Kloeppel et al.

It is certified that error appears in the above-identified patent and that said Letters Patent is hereby corrected as shown below:

Column 10, line 53, " claim 17 " depends on --claim 14--.

Signed and Sealed this

Fifth Day of November, 1996

Attest:

BRUCE LEHMAN

Attesting Officer

Commissioner of Patents and Trademarks